(12) United States Patent
Taniyama et al.

(10) Patent No.: US 7,035,506 B2
(45) Date of Patent: Apr. 25, 2006

(54) OPTICAL MODULE USING GRADIENT INDEX ROD LENS

(75) Inventors: Minoru Taniyama, Osaka (JP);
Takahiro Hashimoto, Osaka (JP);
Takashi Fukuzawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 88 days.

(21) Appl. No.: 10/685,088

(22) Filed: Oct. 10, 2003

(65) Prior Publication Data
US 2004/0114862 A1 Jun. 17, 2004

(30) Foreign Application Priority Data
Oct. 10, 2002 (JP) .............................. 2002-297392

(51) Int. Cl.
*G02B 6/32* (2006.01)
*G02B 6/26* (2006.01)

(52) U.S. Cl. .......................................... 385/34; 385/47

(58) Field of Classification Search ................ 385/16, 385/18, 24, 31, 33–35, 47, 60, 61, 72–74, 385/77–79, 89, 93, 119
See application file for complete search history.

(56) References Cited

U.S. PATENT DOCUMENTS

| 5,588,081 | A | * | 12/1996 | Takahashi | 385/93 |
| 5,680,492 | A | * | 10/1997 | Hopler et al. | 385/34 |
| 6,157,485 | A | * | 12/2000 | Cheng | 359/495 |
| 6,584,271 | B1 | * | 6/2003 | Shi et al. | 385/140 |
| 6,625,352 | B1 | * | 9/2003 | Chang | 385/33 |
| 6,744,566 | B1 | * | 6/2004 | Ludington et al. | 359/717 |
| 6,785,441 | B1 | * | 8/2004 | Ooyama et al. | 385/34 |
| 6,839,485 | B1 | * | 1/2005 | Gardner et al. | 385/33 |
| 2002/0181824 | A1 | * | 12/2002 | Huang et al. | 385/11 |
| 2002/0181865 | A1 | * | 12/2002 | Jang et al. | 385/34 |
| 2003/0026540 | A1 | * | 2/2003 | Fukuzawa et al. | 385/34 |
| 2003/0063853 | A1 | * | 4/2003 | Huang et al. | 385/34 |
| 2003/0076598 | A1 | * | 4/2003 | Kittaka et al. | 359/641 |
| 2003/0091318 | A1 | * | 5/2003 | Shi et al. | 385/140 |
| 2004/0017969 | A1 | * | 1/2004 | Gardner et al. | 385/33 |

FOREIGN PATENT DOCUMENTS
JP 2002-156547 5/2002

OTHER PUBLICATIONS

Melles Griot, "The Practical Application of Light", pp. 15.16-15.20, Melles Griot, 1999.*

* cited by examiner

*Primary Examiner*—Michelle Connelly-Cushwa
(74) *Attorney, Agent, or Firm*—Boyle Fredrickson Newholm Stein & Gratz S.C.

(57) ABSTRACT

An optical module includes at least one optical fiber, a gradient index rod lens, and an optical element. The rod lens is placed at a position separated from an end surface of the optical fiber by a space. The optical element is separated from the rod lens. Outgoing light from the single optical fiber is inputted to the optical element via the rod lens, and light reflected by the optical element is coupled to the optical fiber via the rod lens. When a distance between the rod lens and the optical element is longer than a predetermined value, and a lens length optimized for the distance is equal to or less than a predetermined pitch, the rod lens has end surfaces perpendicular to an optical axis.

17 Claims, 4 Drawing Sheets

Comparison between Rod Lens having End Surface inclined relative to Optical Axis(X = 8°) and Rod Lens having End Surfaces Perpendicular to Optical Axis(X = 0°)

Mirror at Focal Point of Lens

Fig.5(b)

Mirror displaced from Focal Point of Lens

OPTICAL MODULE USING GRADIENT INDEX ROD LENS

BACKGROUND OF THE INVENTION

The present invention relates to an optical communication field. More particularly, the present invention relates to an optical module using a gradient index rod lens, which module is used, for example, in an optical multiplexer for combining signals, an optical demultiplexer for separating signals, a demultiplexer/multiplexer in a narrow sense for combining and separating signals, and a demultiplexer/multiplexer such as an optical branching and coupling device.

Figure 8:
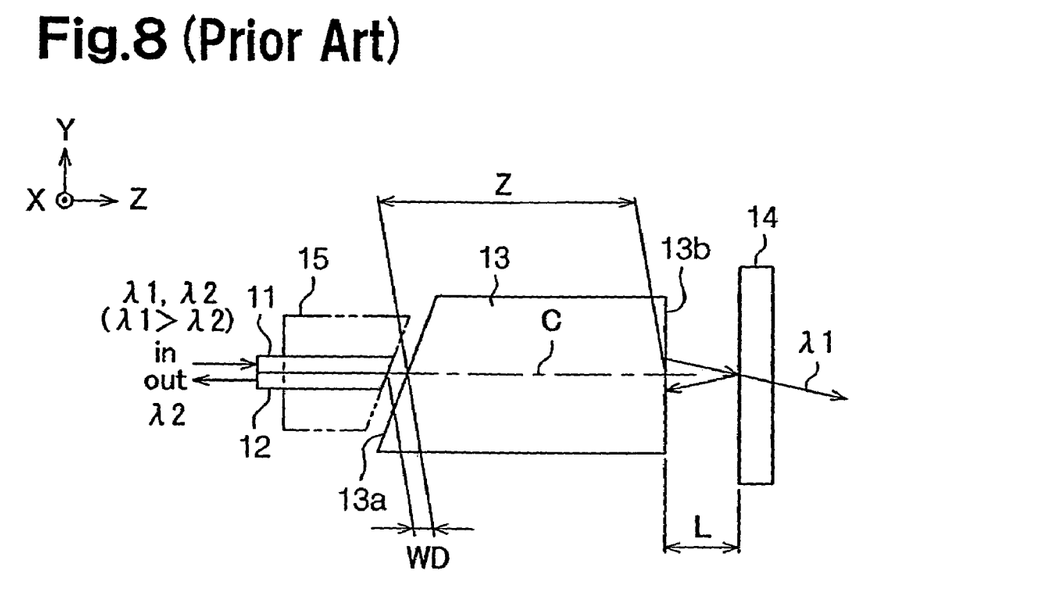
FIG. 8 is a schematic view showing a prior art optical module.

Such an optical module is disclosed in Japanese Laid-Open Patent Publication No. 2002-156547. As shown in FIG. 8, the optical module of the publication includes two optical fibers (single mode optical fibers) 11, 12, and a gradient index rod lens 13. A mirror 14 is provided at a position that is separated from the rod lens 13 by a predetermined distance L. A left end surface 13a of the rod lens 13 is ground to be inclined at a predetermined angle (for example, 8°) relative to a plane perpendicular to an optical axis C. A right end surface 13b of the rod lens 13 is ground to be flat and perpendicular to the optical axis C. The two optical fibers 11, 12 are supported by a capillary 15. The end surfaces of the optical fibers 11, 12 and the end surface of the capillary 15 are ground to be inclined like the left end surface 13a of the rod lens 13.

The optical fiber 11 is used to let light reach and enter the rod lens 13, and is referred to as an incoming optical fiber. The optical fiber 12 is used to transmit light from the rod lens 13, and is referred to as an outgoing optical fiber. Outgoing light from the incoming optical fiber 11 is focused by the rod lens 13 and the light reaches the mirror 14. Light reflected by the mirror 14 is focused by the rod lens 13 and the light is coupled to the outgoing optical fiber 12.

When such an optical module is used in a demultiplexer/multiplexer, a gradient index rod lens 13 is used having a lens length Z of 0.25 pitch or 0.23 pitch. In this case, the distance L between the right end surface 13b of the rod lens 13 and the mirror 14 is relatively short, 0 to 0.5 mm. "Pitch" refers to a period of meandering of a beam in a rod lens and is represented by P in the following description.

When the distance L needs to be extended, for example, to 1 mm in a conventional optical module, the rod lens 13 needs to be a lens that has a lens length Z of less than 0.23P. However, if such a rod lens, which has a short pitch and a ground inclined end surface, is used, an insertion loss is increased. "Insertion loss" is represented by the following equation.

Insertion loss (dB)=−10×Log (Pout/Pin)

in which Pout represents the amount of outgoing light, and Pout represents the amount of reflected return.

The insertion loss is increased because, if the distance L is extended, the space WD between the rod lens 13 and the optical fibers 11, 12 is increased, and the influence of astigmatism and coma aberration due to the inclined end surface (the left end surface 13a) of the rod lens 13 is increased. The left end surface 13a of the rod lens 13 is machined to be an inclined surface so that light reflected by the left end surface 13a does not return to the incoming optical fiber 11. That is, the left end surface 13a is inclined to decrease reflected return light from the left end surface 13a.

SUMMARY OF THE INVENTION

Accordingly, it is an objective of the present invention to provide an optical module using a gradient index rod lens, which optical module is capable of decreasing insertion loss and reflected return light even if the distance between a rod lens and an optical element is extended.

To achieve the foregoing and other objectives and in accordance with the purpose of the present invention, an optical module having at least one optical fiber, a gradient index rod lens, and an optical element is provided. The optical fiber has an end surface. The rod lens is placed at a position separated from the end surface of the at least one optical fiber by a space. The optical element is separated from the rod lens. Outgoing light from the optical fiber is inputted to the optical element via the rod lens, and light reflected by the optical element is coupled to the optical fiber via the rod lens. When a distance between the rod lens and the optical element is longer than a predetermined distance, and a lens length optimized for the distance is equal to or less than a predetermined pitch, the rod lens has end surfaces perpendicular to an optical axis.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Optical modules using gradient index rod lenses according to embodiments of the present invention will now be described with reference to the drawings.

Prior to the description of an optical module according to a first embodiment, an optical module having a similar structure will be described with reference to FIGS. 5(a), 5(b), 6(a), and 6(b). Specifically, the distance L will be described, which is the distance between a gradient index rod lens and an optical element, which is a mirror, in the optical module.

An optical module shown in FIG. 5(a) includes two optical fibers (single mode optical fibers) 21, 22, and a gradient index rod lens (hereinafter simply referred to as rod lens) 23. The rod lens 23 has end surfaces 23a, 23b, which are ground to lie in planes perpendicular to an optical axis C (x=0°). An optical element, which is a mirror 24, is provided at a position that is separated from the rod lens 23 by a predetermined distance L. The mirror 24 is a dichroic mirror that permits light having a wavelength of λ1 to pass through and reflects light having a wavelength of λ2 (λ1>λ2).

The optical fiber 21 is used to let light reach and enter the rod lens 23, and is referred to as an incoming optical fiber. The optical fiber 22 is used to transmit light from the rod lens 23, and is referred to as an outgoing optical fiber. Outgoing light from the incoming optical fiber 21 contains light having a wavelength of λ1 and light having a wavelength of λ2. The outgoing light is focused by the rod lens 23 and reaches the mirror 24. The light having the wavelength of λ2 in the outgoing light is reflected by the mirror 24 and is then focused by the rod lens 23. Then, the light having the wavelength of λ2 is coupled to the outgoing optical fiber 22. On the other hand, light having the wavelength of λ1 passes through the mirror 24.

The two optical fibers 21, 22 are held in parallel by a capillary (not shown). The optical fibers 21, 22 and the rod lens 23 are arranged such that the distance between the end surface of the optical fiber 21 and the end surface 23a of the rod lens 23 is equal to the distance between the end surface of the optical fiber 22 and the end surface 23a. When causing outgoing light from the incoming optical fiber 21 to enter the outgoing optical fiber 22 via the rod lens 23 and the mirror 24, the center of the capillary needs to be located in the vicinity of the optical axis of the rod lens 23, and the optical axes of the optical fibers 21, 22 need to be substantially parallel to the optical axis C of the rod lens 23. At the same time, the distance between the end surface of the optical fiber 21 and the end surface 23a of the rod lens 23 needs to be equal to the distance between the end surface of the optical fiber 22 and the end surface 23a. Therefore, the centers of the optical fibers 21, 22 are displaced from the optical axis C of the rod lens 23.

Since the cladding diameter of the single mode optical fiber is 125 μm, the distance between the optical fibers 21, 22 (distance between the cores) is 125 μm when the optical fibers 21, 22 are brought into contact. When the center of the capillary is aligned with the optical axis C, the distance between the optical axis C and each of the centers C1, C2 of the optical fibers 21, 22 is 62.5 μm (see FIG. 6(a)). When the optical fibers 21, 22 are separated from each other, the distance between the optical axis C and each of the centers C1, C2 is increased as the distance x between the optical fibers 21, 22 is increased (see FIG. 6(b)).

Figures 5A, 5B:
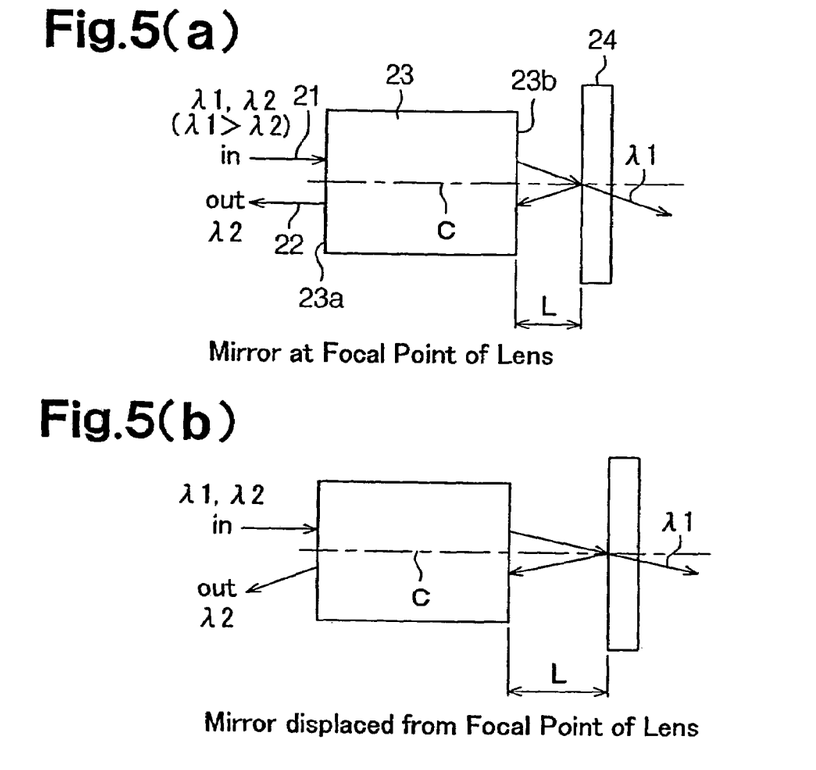
FIG. 5(a) is a diagrammatic view showing a case where a mirror is provided at a focal point.
FIG. 5(b) is a diagrammatic view showing a case where no mirror is provided at a focal point.
Figures 6A, 6B:
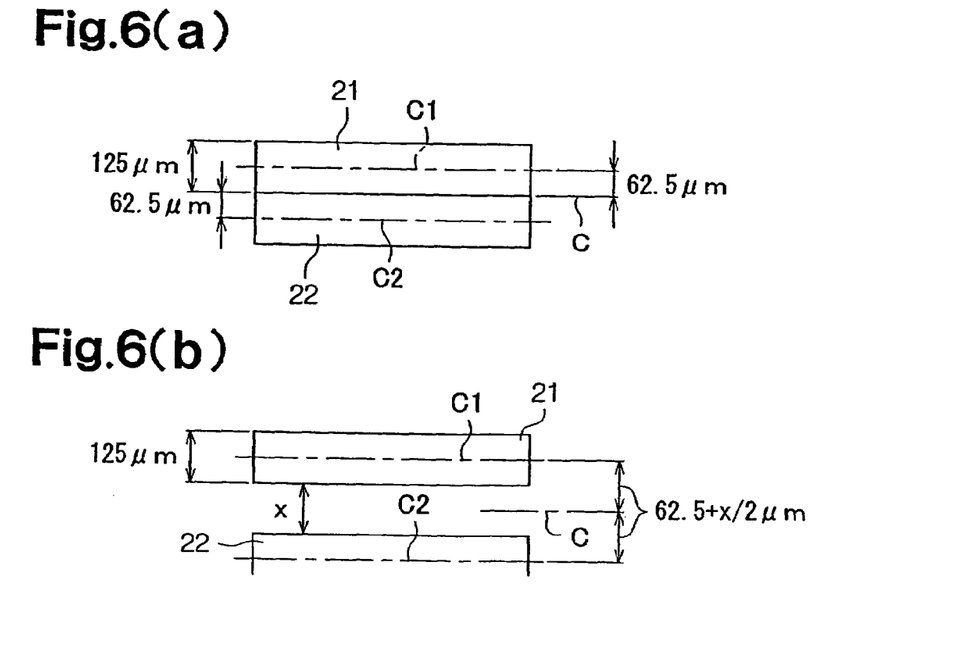
FIG. 6(a) is a diagrammatic view showing a case where two optical fibers contact each other.
FIG. 6(b) is a diagrammatic view showing a case where two optical fibers are separated from each other.

In the optical module shown in FIG. 5(a), outgoing light from the incoming optical fiber 21 enters the rod lens 23 from a part displaced from the optical axis. Outgoing light from a part displaced from the optical axis of the rod lens 23 is coupled to the outgoing optical fiber 22. Therefore, in this optical module, when the mirror 24 is placed at the focal point of the rod lens 23 as shown in FIG. 5(a), outgoing light from the rod lens 23 is parallel to the optical axis C. In contrast, when the mirror 24 is not placed at the focal point of the rod lens 23 as shown in FIG. 5(b), outgoing light from the rod lens 23 is inclined relative to the optical axis C.

When outgoing light that is inclined relative to the optical axis C enters the optical fiber 22, the insertion loss is increased as the inclination angle is increased. That is, as the distance L is extended when the mirror 24 is displaced from the focal point of the rod lens 23, the insertion loss is increased. This tendency is shown in FIG. 7.

Figure 7:
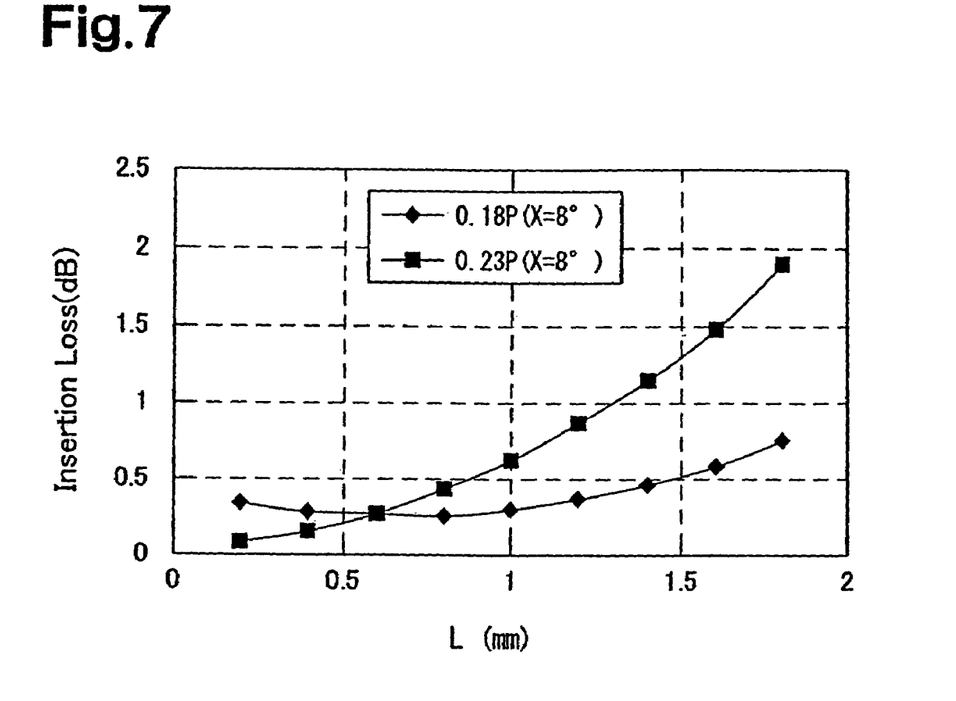
FIG. 7 is a graph showing two types of data related to rod lenses of different length, each having an end surface inclined relative to an optical axis.

The graph of FIG. 7 shows the results of measurements of the relationship between the distance L and the insertion loss, in which the lens length of the rod lens of the optical module shown in FIG. 8 was changed between 0.18P and 0.23P. In the optical module of FIG. 8, the facing end surfaces of the optical fibers 11, 12 and the rod lens 13 are inclined by 8° relative to a plane perpendicular to the optical axis. Even if the optical module shown in FIGS. 5(a) and 5(b) having the rod lens 23 the end surfaces of which are perpendicular to the optical axis C is used, substantially the same measurement results as those shown in FIG. 7 are obtained.

In the optical module of FIG. 8, a value of the distance L that minimizes the insertion loss is, in theory, a calculation value $L_0$ represented by the following formula 1. In an optical module of 0.18P, the calculation value $L_0$ is 0.919 mm. In an optical module of 0.23P, the calculation value $L_0$ is 0.247 mm. FIG. 7 shows the same tendency as these calculation results.

In this calculation, a rod lens of ψ1.8 mm, which is most commonly used in the optical communication field and has a parabolic gradient index along a radial direction, was used as the rod lens 13. λ was set to 1.55 μm, $n_0$ was set to 1.59, and $\sqrt{A}$ was set to 0.322.

$$L_0 = 1/(n_0 \times \sqrt{A} \times \tan(\sqrt{A} \times Z)) \quad \text{(Formula 1)}$$

The gradient index n(r) in the rod lens 13 is represented by an equation $n(r)=n_0(1-(A/2)r^2)$, in which r represents the radial distance from the center of the lens. $n_0$ represents the refractive index on the central axis of the rod lens, and $\sqrt{A}$ represents an index gradient constant.

Therefore, in the optical modules shown in FIGS. 5(a) and 5(b), a rod lens having a lens length Z of an optimal pitch that satisfies an equation $L=L_0$ for a desired distance L needs to be used as the rod lens 23, and the mirror 24 needs to be located at the focal point of the rod lens 23. As obvious from the formula 1, the lens length Z of the optimal pitch varies according to the central axis refractive index $n_0$ of the rod lens and the gradient index constant $\sqrt{A}$.

In this case, one problem occurs. In the above optical module of FIGS. 5(a) and 5(b), the insertion loss is preferably small, while the return loss (RL) of reflected return light needs to be maximized to prevent crosstalk. Normally, an inequality $RL \leq 55$ dB must be satisfied. The return loss (RL) is represented by the following equation.

$$RL(\text{dB}) = 10 \times \text{Log}(P\text{in}/P'\text{in})$$

Pin represents an outgoing light amount from the optical fiber 21, and P'in represents an amount of reflected return light to the optical fiber 21.

In the optical communication field, to increase the return loss RL, the end surfaces of optical fibers and the end surface of a rod lens facing the optical fibers are typically ground to be inclined as in the prior art optical module shown in FIG. 8. When the distance L is extended, a rod lens having a short lens length is needed. However, if the lens length Z of a rod lens having an end surface inclined relative to an optical axis is shortened, the insertion loss is adversely affected for the above described reasons. This is shown in the graph of FIG. 2.

Figure 2:
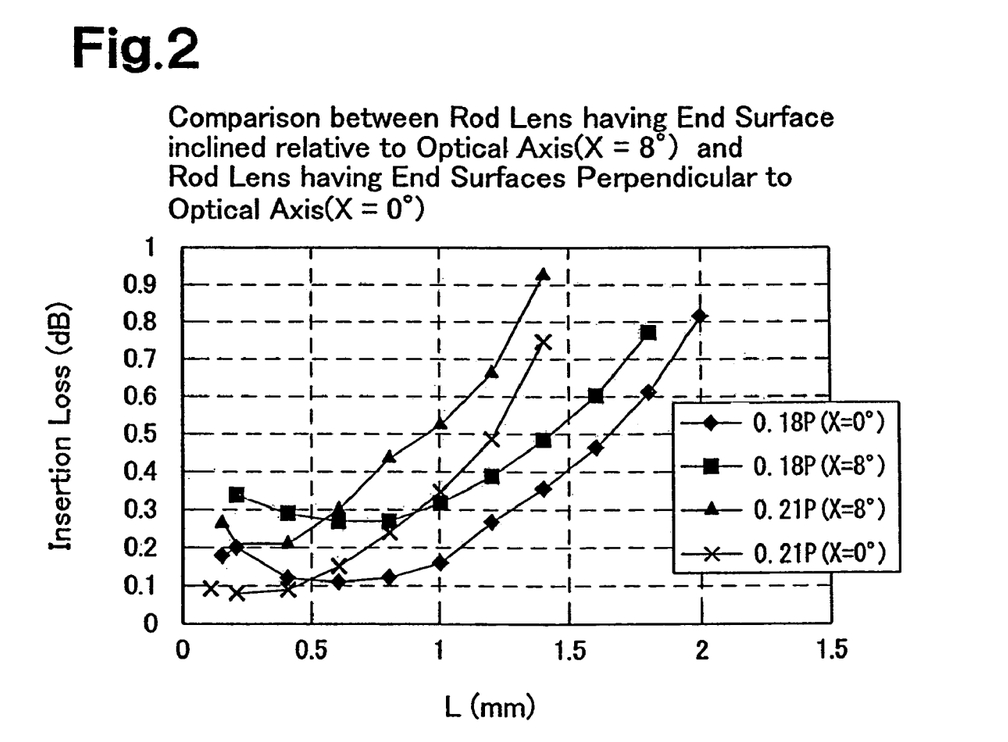
FIG. 2 is a graph showing the relationship between insertion loss and a distance L between a rod lens and a mirror regarding two types of lenses.

The graph of FIG. 2 shows the results of measurements of the relationship between the insertion loss and the distance L between the rod lens and the mirror regarding the optical module of FIG. 8, in which a rod lens having an end surface inclined relative to the optical axis is used, and the optical module of FIGS. 5(a) and 5(b), the end surfaces of which are perpendicular to the optical axis is used. The graph of FIG. 2 shows the results of measurements of the relationship between the distance L and the insertion loss, in which the lens length Z of the rod lens of the optical modules was changed between 0.18P and 0.21P. As obvious from FIG. 2, in both cases when the lens length Z is 0.18P and when the lens length Z is 0.21P, the insertion loss of the optical module of FIGS. 5(a) and 5(b) is less than the insertion loss of the optical module of FIG. 8. That is, in an optical module using a short rod lens having a lens length Z equal to or less than 0.21P, the insertion loss of a rod lens the end surfaces of which are perpendicular to the optical axis (x=0°) is less than the insertion loss of a rod lens having an end surface inclined relative to the optical axis (x=80).

Figure 3:
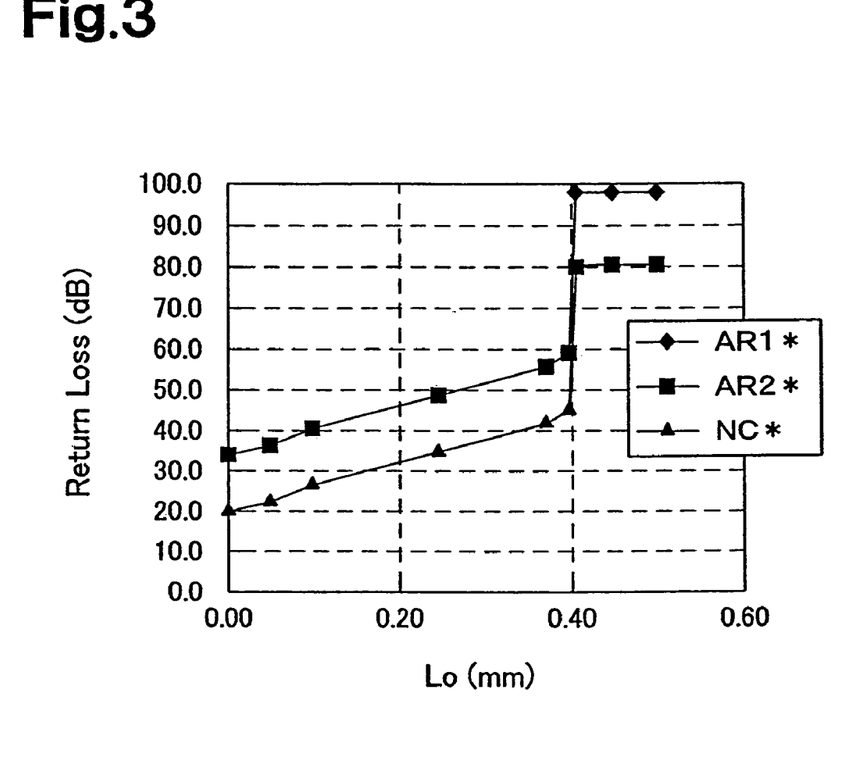
FIG. 3 is a graph showing three types of data in which conditions of reflection prevention films are varied.

On the other hand, in an optical module shown in FIG. 5(a) and 5(b), which uses a rod lens having end surfaces perpendicular to the optical axis, the return loss RL causes a problem. Regarding an optical module that has a rod lens having end surfaces perpendicular to an optical axis, the relationship between the calculation value $L_0$ of the distance L and the return loss RL was obtained through a simulation. The results of the simulation are shown in the graph of FIG. 3 and the following Table 1. In this simulation, a rod lens of ω1.8 mm the end surfaces of which are perpendicular to an optical axis was used. λ was set to 1.55 μm, $n_0$ was set to 1.59, and $\sqrt{A}$ was set to 0.322. The inclination angle of the inclined end surfaces of the optical fibers 21, 22 were set to 8°. In FIG. 3, AR1 represents data of a case where an antireflection film is provided on each of the end surface of the rod lens and the end surfaces of the optical fibers (SMF). AR2 represents data in a case where an antireflection film is provided only on each of the end surfaces of the rod lens. NC represents data in a case where no antireflection film is provided on any of the rod lens and the optical fibers.

TABLE 1

<Relationship between $L_0$, WD and Return Loss (RL)>
Calculation Values of Rod Lens (φ1.8 mm) with End Surfaces Perpendicular to Optical Axis
λ = 1.55 μm, $n_0$ = 1.59, $\sqrt{A}$ = 0.322
End surface of Single Mode Optical Fiber (SMF) is inclined by 8°.

| WD (mm) | Z (mm) | Pitch | $L_0$ (mm) | RL(dB) AR1* | RL(dB) AR2* | RL(dB) NC* |
|---|---|---|---|---|---|---|
| 0.009 | 4.864 | 0.249 | 0.00 | 34.2 | 34.2 | 20.0 |
| 0.050 | 4.799 | 0.246 | 0.05 | 36.4 | 36.4 | 22.3 |
| 0.099 | 4.720 | 0.242 | 0.10 | 40.7 | 40.7 | 26.6 |
| 0.246 | 4.488 | 0.230 | 0.25 | 48.9 | 48.9 | 34.8 |
| 0.371 | 4.293 | 0.220 | 0.37 | 56.1 | 56.1 | 42.0 |
| 0.386 | 4.257 | 0.218 | 0.40 | 59.4 | 59.4 | 45.3 |
| 0.395 | 4.242 | 0.217 | 0.41 | 98.2 | 80.8 | 80.8 |
| 0.435 | 4.182 | 0.214 | 0.45 | 98.2 | 80.8 | 80.8 |
| 0.499 | 4.098 | 0.210 | 0.50 | 98.2 | 80.8 | 80.8 |

*Refractive Index of Antireflection Film is 0.2%
AR1 Antireflection Film applied to Rod Lens and SMF
AR2 Antireflection Film applied to Rod Lens only
NC No Antireflection Film applied to Rod Lens and SMF As obvious from the graph of FIG. 3 and Table 1, when the calculation value $L_0$ of the distance L is more than approximately 0.40 mm in a rod lens having end surfaces perpendicular to the optical axis, the return loss RL is abruptly increased from approximately 60 dB. That is, when the distance L is longer than approximately 0.40 mm, the return loss RL is sufficiently greater than 55 dB, which is normally desired in the optical communication field, even if a rod lens having end surfaces perpendicular to the optical axis is used. It is thus predicted that reflected return light will not present a problem.

Although a shorter lens length Z of the rod lens is advantageous, outgoing light from the optical fiber will spread beyond the effective diameter of the rod lens if the lens length Z is too short. As a result, the influence of astigmatism and coma aberration will increase the insertion loss. Therefore, if the effective diameter of the rod lens is decreased to 60% of the outer diameter, the shortest lens length Z that ensures a required low insertion loss is theoretically about 0.1P. Therefore, the lower limit of the lens Z is preferably about 0.1P.

As described above, when the distance L between the rod lens and the mirror is longer than a predetermined value (L>0.4 mm), and the lens length that is optimized for the distance L is less than 0.23P, it is preferable to construct the optical module with a rod lens having end surfaces perpendicular to the optical axis. Such an optical module according to the first embodiment is shown in FIG. 1.

Figure 1:
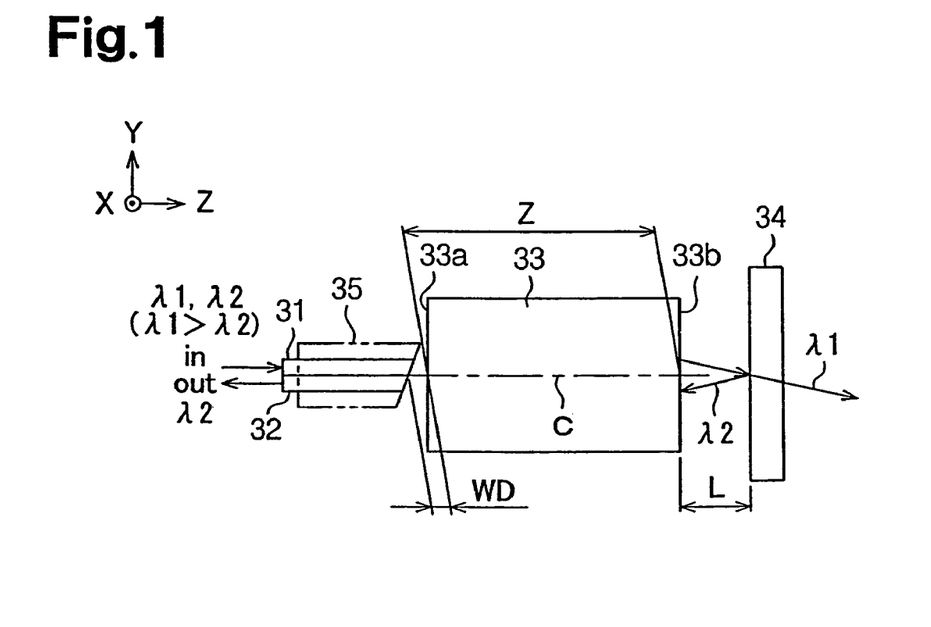
FIG. 1 is a schematic view showing an optical module according to a first embodiment.

The optical module of FIG. 1 includes two optical fibers (single mode optical fibers) 31, 32 and a gradient index rod lens 33. A mirror 34 is provided at a position that is separated from the rod lens 33 by a predetermined distance L. A left end surface 33a and a right end surface 33b of the rod lens 33 are each ground to be a flat surface perpendicular to an optical axis C. The two optical fibers 31, 32 are supported by a capillary 35. The end surfaces of the optical fibers 31, 32 and the end surface of the capillary 35 are ground to be surfaces inclined relative to a plane perpendicular to the optical axis.

The optical fiber 31 is used to let light to reach and enter the rod lens 33, and is referred to as an incoming optical fiber. The optical fiber 32 is used to transmit light from the rod lens 33 and is referred to as an outgoing optical fiber. Outgoing light from the incoming optical fiber 31 is focused by the rod lens 33 and reaches the mirror 34. Light reflected by the mirror 34 is focused by the rod lens 33 and is coupled to the outgoing optical fiber 32.

Also, a desired distance L of the optical module is longer than a predetermined value (L>0.4 mm). The rod lens 33 has a lens length Z having a pitch optimized for the distance L. The mirror 34 is located at about the focal point of the rod lens 33. The lens length Z of the optimized pitch is preferably set within a range between 0.21P and 0.1P inclusive.

Further, it has been confirmed that the insertion loss is minimized when the distance L has a value that is less than the calculation value $L_0$. That is, actual measurements shown in FIG. 2 revealed that, if a rod lens having a lens length Z of 0.21P and end surfaces perpendicular to the optical axis is used for the optical module, the insertion loss is minimized not at a position where the calculation value $L_0$ is 0.501 mm, but at a position where the distance L is in a range between 0.2 and 0.4 mm.

Likewise, the measurements shown in FIG. 2 revealed that, if a rod lens having a lens length Z of 0.18P and end surfaces perpendicular to the optical axis is used for the optical module, the insertion loss is minimized not at a position where the calculation value $L_0$ is 0.919 mm, but at a position where the distance L is in a range between 0.4 and 0.9 mm. Therefore, when a desired distance between the lens and the optical fibers is represented by $L_d$, and the unit of distance is mm, the following formula 2 is satisfied.

$$L_0 - 0.3 \leq L_d \leq L_0 \quad \text{(Formula 2)}$$

It is appropriate to set the parameters according to the formula 2. That is, since the actual measurement revealed that the insertion loss is minimized at a position where the distance L is shorter than the calculation value $L_0$ by 0.3 mm, the design value $L_d$ of the distance L is set in consideration of this difference. Particularly, the design value $L_d$ is set shorter than the calculation value $L_0$ of the distance L calculated according to the formula 1.

Further, if the optical module is configured such that light of a wavelength λ1 that has passed through the mirror 34 is focused by a rod lens (not shown) and is coupled to an optical fiber, a three port demultiplexer/multiplexer is provided.

The above configured first embodiment provides the following advantages.

(1) A rod lens having end surfaces perpendicular to the optical axis is used as the rod lens 33. Therefore, even if the distance L between the rod lens 33 and the mirror 34 is long, astigmatism and coma aberration due to the inclined end surfaces are eliminated, which decreases the insertion loss.

(2) Since the space WD between the optical fibers 31, 32 and the rod lens 33 is extended as the distance L is extended, the reflected return light, which is reflected by the left end surface 33a of the rod lens 33 facing the end surface of the incoming optical fiber 31 and returns to the optical fiber 31, is reduced. That is, when the design value $L_d$ of the distance L is longer than 0.40 mm, the return loss RL is sufficiently greater than 55 dB, which is normally desired in the optical communication field, even if a rod lens having end surfaces perpendicular to the optical axis is used. The reflected return light is therefore not a problem.

(3) When the distance L is longer than a predetermined value (L>0.4 mm), a rod lens having end surfaces perpendicular to the optical axis is used as the rod lens 33, which has a lens length Z of a pitch optimized for the distance L. The lens length Z of the optimized pitch is set within a range between 0.21P and 0.1P inclusive.

Accordingly, the return loss RL is greater than normally required 55 dB, even if the distance L between the rod lens 33 and the mirror 34 is long. Thus, the reflected return light presents no problem. That is, the reflected return light to the incoming optical fiber 31 is limited to equal to or less than a predetermined value. Therefore, even if the distance between the rod lens and the optical element is long, the insertion loss and the reflected return light are reduced. In this manner, a high-performance optical module that can be used in the optical communication field is obtained.

(4) By placing the mirror 34 at about the focal point of the rod lens 33, the insertion loss is reduced.

(5) Since a rod lens having end surfaces perpendicular to the optical axis is used as the rod lens 33, astigmatism and coma aberration are reduced. Also, compared to a case where a rod lens having a left end surface inclined with respect to the optical axis, machining is simplified. Also, the costs and the manufacturing tolerances are lowered.

(6) The actual measurements have revealed that the insertion loss is minimized at a position where the distance L is less than the calculation value $L_0$ by 0.3 mm. Thus, in consideration of the difference, the design value $L_d$ of the distance L is set less than the calculation value $L_0$ of the distance L computed according to the formula 1 (see formula 2). Therefore, the rod lens and the mirror are located at positions that actually minimize the insertion loss.

Figure 4:
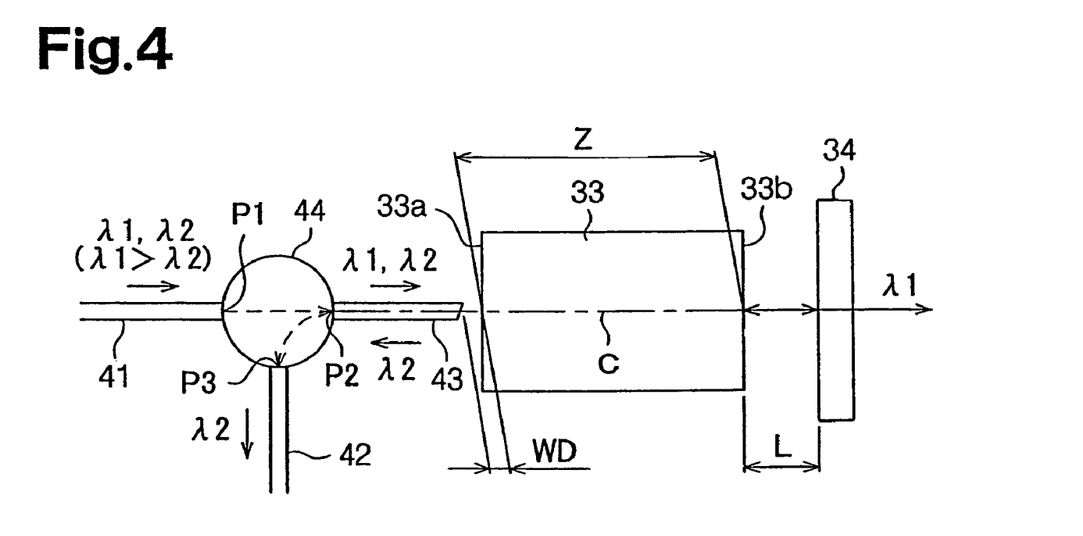
FIG. 4 is a schematic view showing an optical module according to a second embodiment.

FIG. 4 illustrates an optical module using a gradient index rod lens according to a second embodiment.

In this optical module, a single optical fiber 43 is located at an incoming side of a rod lens 33. An optical circulator 44 is connected to the incoming optical fiber 43. The optical circulator 44 has a first terminal P1, a second terminal P2, and a third terminal P3. An optical fiber 41 is connected to the first terminal P1 of the optical circulator 44. The optical fiber 41 transmits light from an electrical-to-optical (E/O) converter (not shown) that includes a semiconductor laser or a light-emitting diode. The incoming optical fiber 43 is connected to the second terminal P2. An optical fiber 42 is connected to the third terminal P3. The optical fiber 42 transmits light from an electrical-to-optical (E/O) that includes a light-receiving diode. Light that enters the first terminal P1 from the optical fiber 41 is outputted to the incoming optical fiber 43 from the second terminal P2. Light from the rod lens 33 that is sent to the optical fiber 43 and is inputted to the second terminal P2 is outputted only to the third terminal P3.

In addition to the advantages (1) to (6), the second embodiment provides the following advantages.

(7) Light that is inputted to the first terminal P1 of the optical circulator 44 is outputted from the second terminal P2 to the incoming optical fiber 43. Light from the optical fiber 43 reaches the rod lens 33. Light that is reflected by the mirror 34, sent to the optical fiber 43 through the rod lens 33, and inputted to the second terminal P2 is outputted only to the third terminal P3. This optical module reduces the insertion loss and the reflected return light at the same time.

(8) The incoming optical fiber 43, which transmits light with the rod lens 33, is a single optical fiber. Therefore, alignment of the optical fiber 43 with the rod lens 33 is easy.

(9) In the first embodiment, light is reflected by the inclined surface of the optical fiber 31 and also by the inclined surface of the optical fiber 32. In the second embodiment, only the light reflected by the inclined surface of the single optical fiber 43 needs to be taken into consideration, which further reduces the reflected return light.

It should be apparent to those skilled in the art that the present invention may be embodied in many other specific forms without departing from the spirit or scope of the invention. Particularly, it should be understood that the invention may be embodied in the following forms.

In the illustrated embodiments, the mirror 34 is used as the optical element. However, the present invention may be applied to a module that uses a dielectric multilayer film as an optical element. As a dielectric multilayer film, an edge filter such as a long wavelength range pass filter and a short wavelength range pass filter, or a band pass filter may be used.

In the illustrated embodiments, the optical module includes at least one optical fiber and a gradient index rod lens. However, the present invention may be applied to optical modules having other optical elements such as the mirror 34 and a filter.

In the illustrated embodiments, light of a wavelength λ1 that has passed through the mirror 34 is focused by a rod lens (not shown) and is coupled to an optical fiber. Accordingly, a three-port demultiplexer/multiplexer is provided. That is, the optical modules may be applied to the three-port demultiplexer/multiplexer. However, the present invention may be applied to other types of optical modules. For example, the present invention may be applied to an optical module applied to a three-port optical branching and coupling device. In this case, the mirror 34 is replaced by a half mirror. Light of a single wavelength is inputted to the optical fiber 31, and separated by the half mirror. Light reflected by the half mirror is coupled to the optical fiber 32. Light that passes through the optical fiber 32 is coupled to an optical fiber (not shown) through a rod lens (not shown).

Therefore, the present examples and embodiments are to be considered as illustrative and not restrictive and the invention is not to be limited to the details given herein, but may be modified within the scope and equivalence of the appended claims.

The invention claimed is:

1. An optical module, comprising:
   at least one optical fiber having an end surface;
   a gradient index rod lens, wherein the rod lens is placed at a position separated form the end surface of the at least one optical fiber by a space; and
   an optical element that is separated from the rod lens, wherein outgoing light from the at least one optical fiber is inputted to the optical element via the rod lens, and light reflected by the optical element is occupied to the at least one optical fiber via the rod lens; and
   an optical circulator connected to the incoming optical fiber, the optical circulator having a first terminal, a second terminal, and a third terminal,
   wherein at least one optical fiber is a single incoming optical fiber that is located at an incoming side of the rod lens and is coaxial with the rod lens,
   wherein a distance between the rod lens and the optical element is longer than about 0.4 mm and a lens length is in a range between about 0.21 pitch and 0.1 pitch, and the rod lens has end surfaces perpendicular to an optical axis.

2. The optical module according to claim 1,
   wherein the rod lens has a parabolic gradient index along a radial direction,
   and wherein, when a calculation of value $L_0$ of the distance L is computed according to the following formula based on a central axis refractive index no of the rod lens, an index gradient constant $\sqrt{A}$, and the lens length Z, $L_0 = 1/(n_0 \times \sqrt{A} \times \tan(\sqrt{A} \times Z))$, and wherein the distance between the rod lens and the optical element is set shorter than the calculation value $L_0$ by a predetermined amount.

3. The optical module according to claim 2, wherein the predetermined amount is about 0.3 mm.

4. The optical module according to claim 1,
   wherein the at least one optical fiber comprises an incoming optical fiber and an outgoing optical fiber, wherein the incoming optical fiber causes light to reach the rod lens from a part displaced from the optical axis, and wherein the outgoing optical fiber is located at a position to which light that is reflected by the optical element and passes through the rod lens is coupled.

5. The optical module according to claim 1,
   wherein the at least one optical fiber comprises an incoming optical fiber that is located at an incoming side of the rod lens and another optical fiber located at a position to which light that is reflected by the optical element is coupled via the rod lens,
   wherein the two optical fibers are held in parallel by a capillary, and wherein end surfaces of the optical fibers are arranged to be spaced from the end surface of the rod lens by an equal distance, and
   wherein optical axes of the two optical fibers are substantially parallel to the optical axis of the rod lens.

6. An optical module, comprising:
   at least one optical fiber having an end surface;
   a gradient index rod lens, wherein the rod lens is placed at a position separated form the end surface of the at least one optical fiber by a space;
   an optical element that is separated from the rod lens, wherein outgoing light from the at least one optical fiber is inputted to the optical element via the rod lens, and light reflected by the optical element is occupied to the at least one optical fiber via the rod lens; and
   wherein the rod lens has end surfaces perpendicular to an optical axis,
   wherein the at least one optical fiber is a single incoming optical fiber that is located at an incoming side of the rod lens and is coaxial with the rod lens,
   wherein an optical circulator is connected to the incoming optical fiber, the optical circulator having a first terminal, a second terminal, and a third terminal,
   wherein light inputted to the first terminal is outputted from the second terminal to the incoming optical fiber, reflected by the optical element, and sent to the incoming optical fiber via the rod lens, and wherein light inputted to the second terminal is outputted only to the third terminal.

7. The optical module according to claim 6, wherein the distance between the rod lens and the optical element is about 0.4 mm.

8. The optical module according to claim 7, wherein the optimized lens length of the rod lens is in a range between about 0.21 pitch and 0.1 pitch inclusive.

9. The optical module according to claim 8, wherein the rod lens has a parabolic gradient index along a radial direction, wherein a calculation of value $L_0$ is computed according to the following formula based on a central axis refractive index $n_0$ of the rod lens, an index gradient constant $\sqrt{A}$, and the lens length Z, $L_0 = 1/(n_0 \sqrt{A} \times \tan(\sqrt{A} \times Z))$, and wherein the distance between the rod lens and the optical element is set shorter than the calculation value $L_0$ by a predetermined amount.

10. The optical module according to claim 9, wherein the predetermined amount is about 0.3 mm.

11. The optical module according to claim 6, wherein the optical element is a dichroic mirror.

12. The optical module according to claim 6, wherein a return loss of optical light through the optical module is greater than 55 dB.

13. The optical module according to claim 6, wherein the optical element is a dielectric multi-layer film.

14. The optical module according to claim 6, wherein the optical element is a half mirror.

15. An optical module using a gradient index rod lens, comprising:
    first and second optical fibers, wherein the first and second optical fibers each have an end surface, and are arranged parallel to each other;
    a gradient index rod lens, wherein the rod lens is placed at a position separated from the end surfaces of the first and second optical fibers by a space; and
    an optical element that is separated from the rod lens, wherein outgoing light from the first optical fiber is inputted to the optical element via the rod lens, and light reflected by the optical element is coupled to the second optical fiber via the rod lens, wherein the end surfaces of the optical fibers are inclined relative to a plane perpendicular to the optical axis of the rod lens by a predetermined angle, and wherein a distance between the rod lens and the optical element is longer than about 0.4 mm, and a lens length optimized for the distance is in a range between about 0.21 pitch and 0.1 pitch inclusive, the rod lens has end surfaces perpendicular to an optical axis.

16. The optical module according to claim 15, wherein the rod lens has a parabolic gradient index along a radial direction, and wherein a calculation value $L_0$ is computed according to the following formula based on a central axis refractive index $n_0$ of the rod lens, an index gradient constant $\sqrt{A}$, and the lens length Z, $$L_0 = 1/(n_0 \times \sqrt{A} \times \tan(\sqrt{A} \times Z)), \text{ and}$$

wherein the distance between the rod lens and the optical element is set shorter than the calculation value L0 by a predetermined amount.

17. The optical module according to claim 15, wherein the first and second optical fibers are arranged to contact each other, and wherein contacting portion of the optical fibers are located on the optical axis of the rod lens.

* * * * *